A. F. Wagner,
Lifting Jack,
Nº 52,096. Patented Jan. 16, 1866.
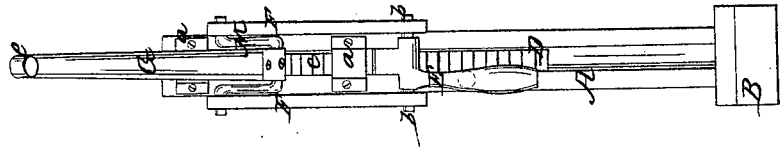
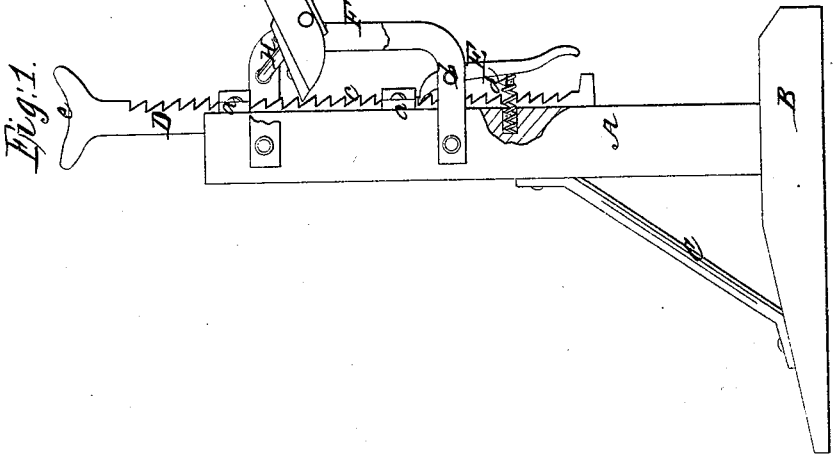
Witnesses.
Inventor.
A. F. Wagner

UNITED STATES PATENT OFFICE.

A. F. WAGNER, OF ILION, NEW YORK.

IMPROVED LIFTING-JACK.

Specification forming part of Letters Patent No. 52,096, dated January 16, 1866.

*To all whom it may concern:*

Be it known that I, A. F. WAGNER, of Ilion, in the county of Herkimer and State of New York, have invented a new and Improved Lifting-Jack; and I do hereby declare that the following is a full, clear, and exact description thereof, which will enable those skilled in the art to make and use the same, reference being had to the accompanying drawings, forming part of this specification, in which—

Figure 1 is a side view of my invention, partly in section; Fig. 2, a front view of the same.

Similar letters of reference indicate corresponding parts.

This invention relates to a new and improved lifting-jack, designed more especially for raising the axles of wheel-vehicles for the purpose of lubricating the same; and it consists in the employment or use of a rising-and-falling rack-bar fitted to an upright stock, in connection with a lever fulcrumed in the upper end of a pair of brackets and holding-pawl pivoted in the lower ends of said brackets, and all arranged in such a manner as to form a cheap, durable, and efficient device for the purpose specified.

A represents an upright or standard, which may be of wood or metal. The former material I prefer. This upright is attached to a suitable base, B, and is braced by a rod, C.

D is a cast-iron rack-bar, fitted in guides $a$ $a$ attached to the upright, allowed to slide freely up and down, and held at any desired point by a pawl, E, which works on journals $b$, fitted in metal bow-shaped bars F F, which are bolted to two opposite sides of the upright, and extend some distance in front of it, as shown clearly in Fig. 1. This pawl is kept engaged with the rack $c$ of the bar D by means of a spring, $d$, which bears against it below the journals $b$. (See Fig. 1.)

G is a lever, which may be of wood, and has its fulcrum on a suspended link, H, fitted between the upper parts of the bars F F. This fulcrum-link admits of the lever being swung toward and from the rack $c$ of the bar D in order to engage said lever with the rack-bar and disengage it therefrom, as desired. The upper end of the rack-bar is provided with a shoulder, $e$, to fit or catch under the article to be raised, the lever, when its outer end is elevated, being pressed forward so as engage with the rack, the latter being raised by pressing down the entire end of the lever, and the lever drawn out free from the rack when its outer end is elevated to obtain another hold, the pawl E holding the rack-bar and weight upon it while the outer end of the lever is being elevated.

In order to let down the article raised by the device, the lower end of pawl E is pressed toward the upright by means of the foot, the rack-bar being slightly raised to relieve the pawl of the weight.

I claim as new and desire to secure by Letters Patent—

The brackets F, projecting from the standard A, in combination with the toothed bar D, the lever G, connected by links H to the upper part of said brackets, and the detaining-pawl E, pivoted at the lower ends of said brackets in position to be readily retracted by the foot, all as herein described.

A. F. WAGNER.

Witnesses:
W. W. THOMAS,
H. H. INGHAM.